United States Patent [19]
Saur et al.

[11] Patent Number: 5,238,185
[45] Date of Patent: Aug. 24, 1993

[54] THERMOSTATIC VALVE DEVICE HAVING A PILOT VALVE

[75] Inventors: Roland Saur, Stuttgart; Manfred Kurz, Ditzingen; Barbu Frunzetti, Kornwestheim, all of Fed. Rep. of Germany

[73] Assignee: Behr-Thomson-Dehnstoffregler GmbH & Co., Fed. Rep. of Germany

[21] Appl. No.: 914,537

[22] Filed: Jul. 17, 1992

[30] Foreign Application Priority Data

Aug. 2, 1991 [DE] Fed. Rep. of Germany ... 9109600[U]

[51] Int. Cl.⁵ .............................................. F01P 7/02
[52] U.S. Cl. .................................. 236/34.5; 236/92 C
[58] Field of Search ................ 236/34, 34.5, 92 C, 236/92 R

[56] References Cited

U.S. PATENT DOCUMENTS

| | | | |
|---|---|---|---|
| 2,400,615 | 5/1946 | Warrick et al. | 236/34.5 |
| 2,873,070 | 2/1959 | Drapeau | 236/34 |
| 2,954,930 | 10/1960 | Linder | 236/34.5 |
| 4,865,249 | 9/1989 | Sugano et al. | 236/92 C |
| 4,978,060 | 12/1990 | Stahly | 236/34.5 |
| 5,048,751 | 9/1991 | DuBois | 236/92 C |

FOREIGN PATENT DOCUMENTS 3101248  4/1988  Fed. Rep. of Germany.

Primary Examiner—William E. Tapolcai
Attorney, Agent, or Firm—Evenson, McKeown, Edwards & Lenahan

[57] ABSTRACT

A thermostatic valve device for a coolant circulating system of an internal-combustion engine having a thermostatic working element which has a housing containing an expansion material and a working piston which is movable out of the housing in a moving-out direction. A valve disk and a valve seat forms a valve. The valve disk is connected to the housing. A restoring spring is coupled to the housing. An abutment supports the working piston such that, when the working piston moves out, the housing moves against the action of the restoring spring to lift the valve disk off the valve seat. The abutment is a thrust bearing. An idle path is between the abutment and the working piston. The idle path is bridged by a first part of the moving-out movement. A bypass connection bypasses the valve. A closing member is mounted on the working piston and closes and opens the bypass connection. The bypass connection and the closing member form a pilot valve which opens during the moving-out of the working piston for bridging the idle path. A closing spring is coupled to the closing member and loads the closing member against the moving-out direction of the working piston.

7 Claims, 3 Drawing Sheets

THERMOSTATIC VALVE DEVICE HAVING A PILOT VALVE

BACKGROUND AND SUMMARY OF THE INVENTION

The present invention relates to a thermostatic valve device, particularly for a coolant circulating system of an internal-combustion engine, having a thermostatic working element which has a housing containing an expansion material and a working piston which can be moved out of the housing. The working piston is supported on an abutment in such a manner that, when the working piston moves out, the housing, which is connected with a valve disk, moves against the action of a restoring spring and lifts the valve disk off a valve seat. The thermostatic valve device has a pilot valve.

Thermostatic valve devices are used in large quantities particularly for controlling the coolant circulating systems of internal-combustion engines in motor vehicles. A problem exists in the case of cold starts. In other words, when the internal-combustion engine is started and the coolant is heated to the operating temperature. When the opening temperature is reached, the valve will open up immediately with a relative large valve cross-section so that, as a rule, there is a relatively high overshooting. A certain improvement has been achieved when the characteristic operating curve in this area is influenced by a special design of the valve seat, specifically by the so-called "pilot valve" seat.

In order to improve the characteristic operating curve in this area, it is also known to integrate an additional pilot valve into the thermostatic valve device. It is also known to arrange in the valve disk of the thermostatic valve device a small additional thermostatic valve as the pilot valve with an additional thermostatic working element. This pilot valve opens up before the opening temperature of the main thermostatic valve device is reached.

In German Patent Document DE-C 31 01 248, a valve disk is shown held on the housing of the thermostatic working element in a "floating" manner. The valve disk is arranged between a disk-type take-along device mounted on the housing and a spring such that the first movement of the housing, when the working piston is moved out, bridges a sort of "idle path." In other words, the valve disk is not yet taken along. In this case, a flow path is exposed between the housing of the thermostatic working element by which the pilot valve effect is obtained. The valve disk will be not be taken along by the housing of the thermostatic working element before the idle path is bridged so that the take-along device comes to rest against the valve disk and takes it along.

An object of the invention is to provide a thermostatic valve device of the initially mentioned type which is distinguished by a simple construction and by a reliable operation.

This and other objects are achieved by the present invention which provides a thermostatic valve device for a coolant circulating system of an internal-combustion engine having a thermostatic working element which has a housing containing an expansion material and a working piston which is movable out of the housing in a moving-out direction. A valve disk and a valve seat forms a valve. The valve disk is connected to the housing. A restoring spring is coupled to the housing. An abutment supports the working piston such that, when the working piston moves out, the housing moves against the action of the restoring spring to lift the valve disk off the valve seat. The abutment is a thrust bearing. An idle path is between the abutment and the working piston. The idle path is bridged by a first part of the moving-out movement. A bypass connection bypasses the valve. A closing member is mounted on the working piston and closes and opens the bypass connection. The bypass connection and the closing member form a pilot valve which opens during the moving-out of the working piston for bridging the idle path. A closing spring is coupled to the closing member and loads the closing member against the moving-out direction of the working piston.

By means of the construction according to the invention, a pilot valve is provided which not only has a pilot effect improving the characteristic operating curve but, in addition, acts as a pressure relief valve. In particular, when the thermostatic valve device is used as a throttle control device, there is the risk that, when the coolant is cold before the thermostatic valve device responds, such a high excess pressure is built up there damages may occur. In this case, the pilot valve is also used which, because of its construction and arrangement, opens up not only when its opening temperature is reached but also when an excess pressure occurs which can be adjusted by means of its closing spring.

Other objects, advantages and novel features of the present invention will become apparent from the following detailed description of the invention when considered in conjunction with the accompanying drawings.

DETAILED DESCRIPTION OF THE DRAWINGS

Figure 1:
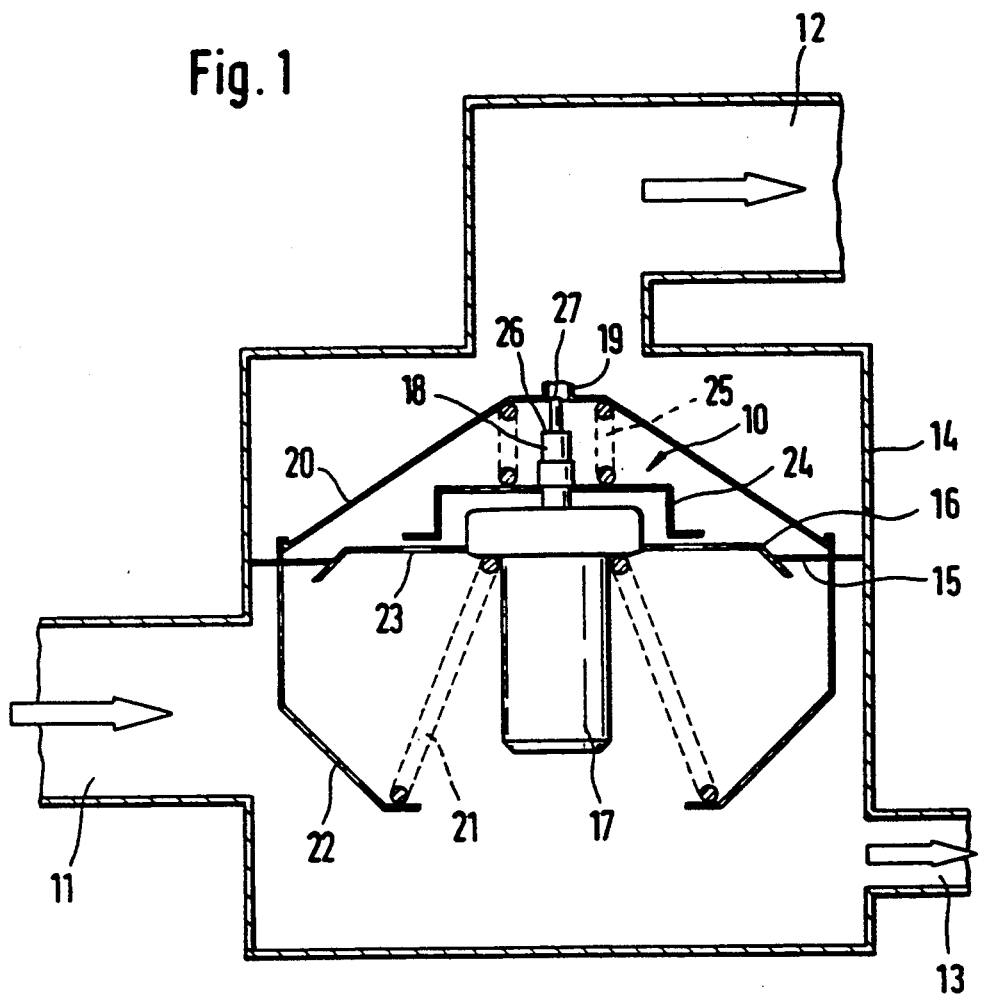
FIG. 1 is a schematic representation of a thermostatic valve device according to an embodiment of the present invention used as a throttle control device.

The thermostatic valve device 10 illustrated in FIG. 1 is installed as a throttle control device into a coolant circulating system of an internal-combustion engine. The thermostatic valve device 10 controls the distribution of the coolant flow between an incoming flow 11 coming from the internal-combustion engine, an outgoing flow leading to a radiator 12 and a throttle opening 13 leading back directly to the engine.

In a valve housing 14, a valve seat 15 is provided which, together with a valve disk 16, forms the main valve. The valve disk 16 is fastened to a housing 17 of a thermostatic working element. In a known manner, the thermostatic working element contains an expansion material, particularly a wax, which expands its volume at a given temperature in such a manner that a working piston 18 is moved out of the housing 17. The working piston 18 is supported on an abutment 19 which is formed by a sheet metal bow 20. When the temperature falls and the expansion material therefore contracts, the working piston 18 is moved back into the housing 17. This is carried out by a restoring spring 21 which loads the valve disk 16 and therefore the housing 17 in the direction of the valve seat 15 and the abutment 19. The restoring spring 21 is held and prestressed by means of bows 22.

For the main valve formed by the valve seat 15 and the valve disk 16, a bypass connection 23 is provided which, in the embodiment according to FIG. 1, comprises bores which are arranged in the valve disk 16 in the shape of a ring. A closing member 24, which is arranged on the moving-out side of the working piston 18 and is fixedly connected with the working piston 18, is assigned to the bypass connection 23. Between this closing member 24 constructed as a valve disk and the bow 20, a closing spring 25 is arranged which surrounds the working piston 18.

The working piston 18 is provided with a ring shoulder 26 which is assigned to the abutment 19. The abutment 19 will not act as an abutment to prevent a further moving-out movement of the working piston 18 until the ring shoulder 26 rests against the abutment 19. A pin-shaped projection 27, by means of which the working piston 18 is guided in the bow 20, projects away from the ring shoulder 26 in the axial direction.

When the cold internal-combustion engine is started in whose cooling circulating system the illustrated thermostatic valve device 10 is arranged as the throttle control device, the thermostatic valve device 10 is at first in the position shown in FIG. 1 in which the valve formed by the valve seat 15 and the valve disk 16 is closed and the bypass connection 23 is also closed. The coolant flows from the inlet 11 by way of the throttle opening 13 back to the internal-combustion engine. Should an excess pressure build up which exceeds the closing force of the closing spring 25 before the thermostatic valve device 10 opens as a function of the temperature, as in FIG. 1, the closing member 24 lifts off and opens up the bypass connection 23 so that a pressure reduction takes place. However, normally the bypass connection 23 remains closed until the coolant temperature has reached a value adjusted by means of the expansion material. When this value is reached and exceeded, the working piston 18 moves out of the housing 17. In this case, the working piston 18 first bridges the idle path given by the distance of the abutment 19 to the ring shoulder 26. During the bridging of this idle path, the housing 17 and therefore also the valve disk 16 remain in the illustrated position so that the valve formed by the valve disk 16 and the valve seat 15 remains closed. However, during the bridging of the idle path, the working piston 18 already takes along the closing member 24 so that the bypass connection 23, as the pilot valve, opens up with a specific characteristic operating curve. It is only when the ring shoulder 26, after reaching and exceeding a second temperature that can be adjusted by way of the length of the idle path, comes to rest against the abutment 19, that the movement of the housing 17 starts and thus the opening of the valve formed by the valve seat 15 and the valve disk 16.

When the coolant temperature falls, the restoring spring 21 presses the housing 17 with the valve disk 16 back until the valve disk 16 comes to rest against the valve seat 15. In this case, the working piston 18 is moved back into the housing 17. When the coolant temperature falls further, the working piston 18, together with the closing member 24, is moved farther into the housing 17 until the closing member 24 comes to rest against the valve disk 16 and the bypass connection 23 closes. The ring shoulder 26 of the working piston 18 moves away from the abutment 19 constructed as a thrust bearing.

The closing spring 25 is designed and prestressed to a force which is clearly lower than the force of the restoring spring 21 so that the closing spring 25 cannot open the valve formed by the valve seat 15 and the valve disk 16.

The valve seat 15, which in FIG. 1 is illustrated only schematically as the edge of an opening of a disk, in actual practice, may in a known manner also be designed as a so-called pilot valve seat.

Figure 2:
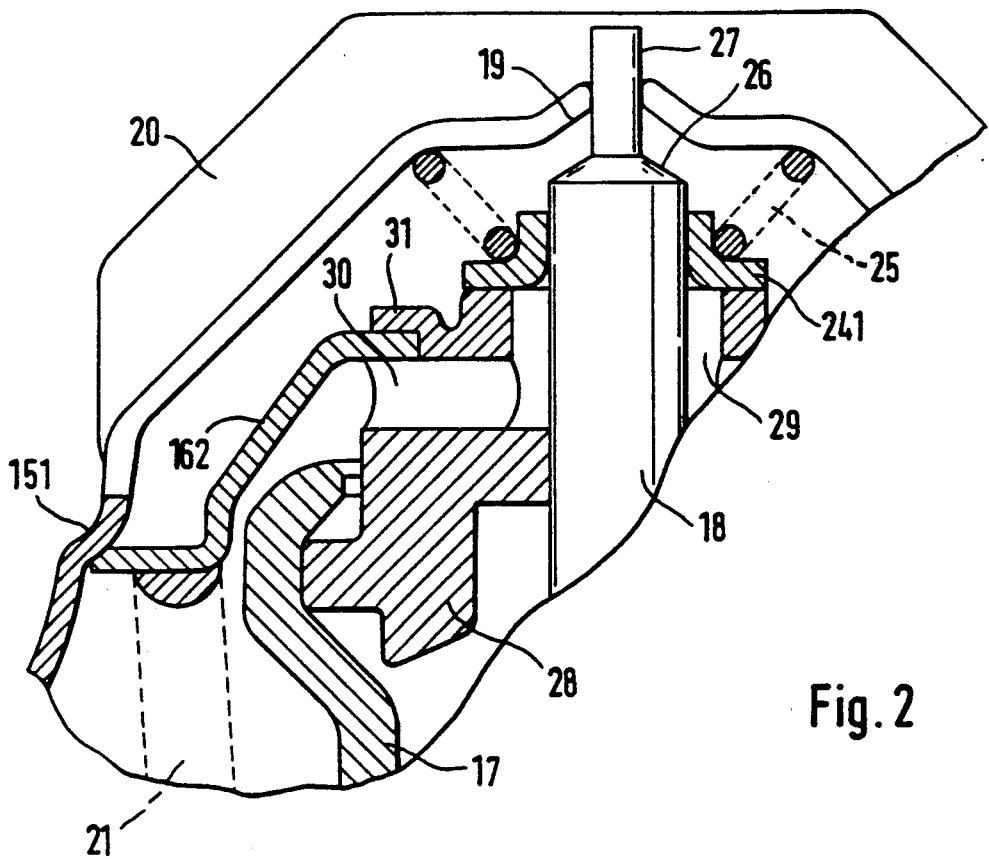
FIG. 2 is an enlarged partial sectional view of an embodiment of a thermostatic valve device according to the present invention.

In the embodiment according to FIG. 2, the bypass connection is constructed in the form of several radial bores 30 and of a ring chamber 29 which is open in the moving-out direction of the working piston 18 and is connected to the bores 30. The bores 30 and the ring chamber 29 are machined into a cover part 28 of the housing 17. The radial bores 30 are situated on the side of the valve disk 162 which faces away from the moving-out direction of the working piston 18 and which is constructed as a sheet metal valve disk. This valve disk 162, which interacts with a valve seat 151 which forms one part with the bow 20, is held on the cover part 28 of the housing 17 by means of an edged connection 31.

A closing member, which is constructed as a valve disk 241, which is pressed onto the working piston 18 by means of a collar and, it necessary, may also be connected with it, is assigned to the moving-out side of the ring chamber 29 surrounding the working piston 18.

The ring shoulder 26 of the working piston 18 has a truncated-cone shape. A correspondingly designed shaped-out part of the bow 20 is assigned to it which acts as the abutment 19.

Figure 3:
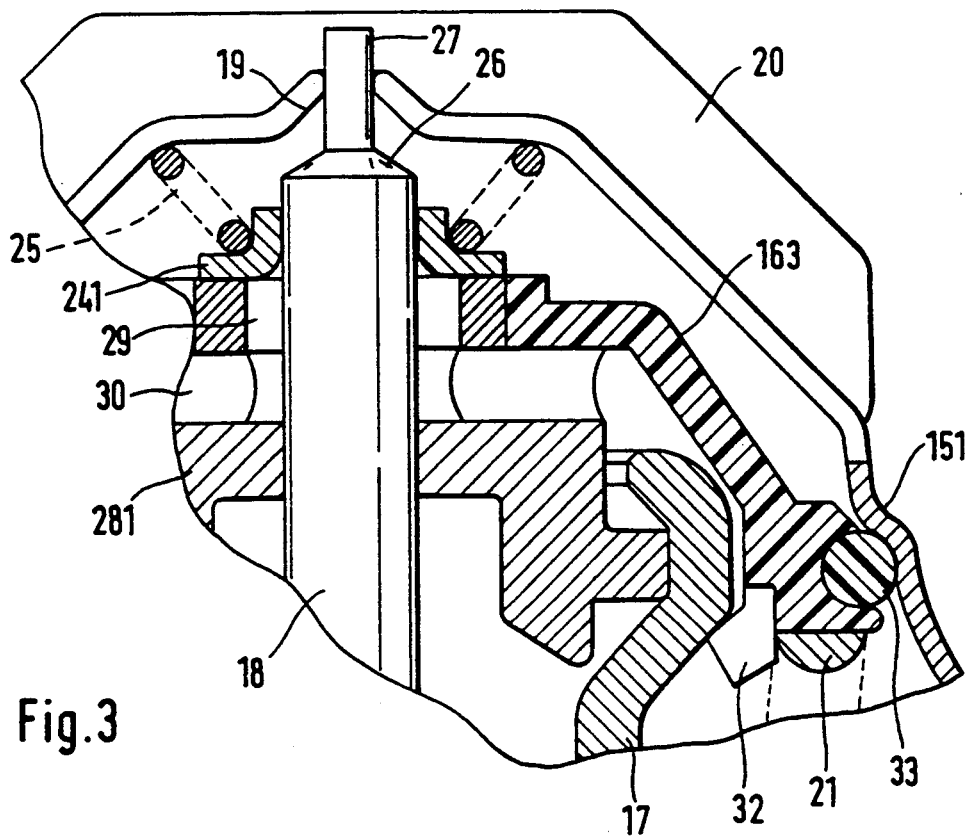
FIG. 3 is a partial sectional view similar to FIG. 2 of another embodiment of the present invention with a clipped-on plastic valve disk.

The embodiment according to FIG. 3 differs from the embodiment according to FIG. 2 essentially by the fact that in this embodiment, a valve disk 163 is provided which is manufactured as a molded plastic part. By means of a hub part, this valve disk 163 rests on a ring shoulder of a cover part 281 of the housing 17 of the thermostatic working element. Corresponding to the embodiment according to FIG. 2, this cover part is provided with a ring chamber 29 and several radial bores 30.

The valve disk 163 is provided with several detents 32 which reach around a collar of the housing 17 so that the valve disk 163 is locked at the cover part 281 and the housing 17. The detents 32 are constructed and arranged such that a sufficient flow path remains in order to let coolant flow to the bores 30 and the ring chamber 29. The valve disk 163 is provided with a recess assigned to the valve seat 151 into which a ring seal 33 is inserted which in the illustrated embodiment has the shape of an O-ring.

Figure 4:
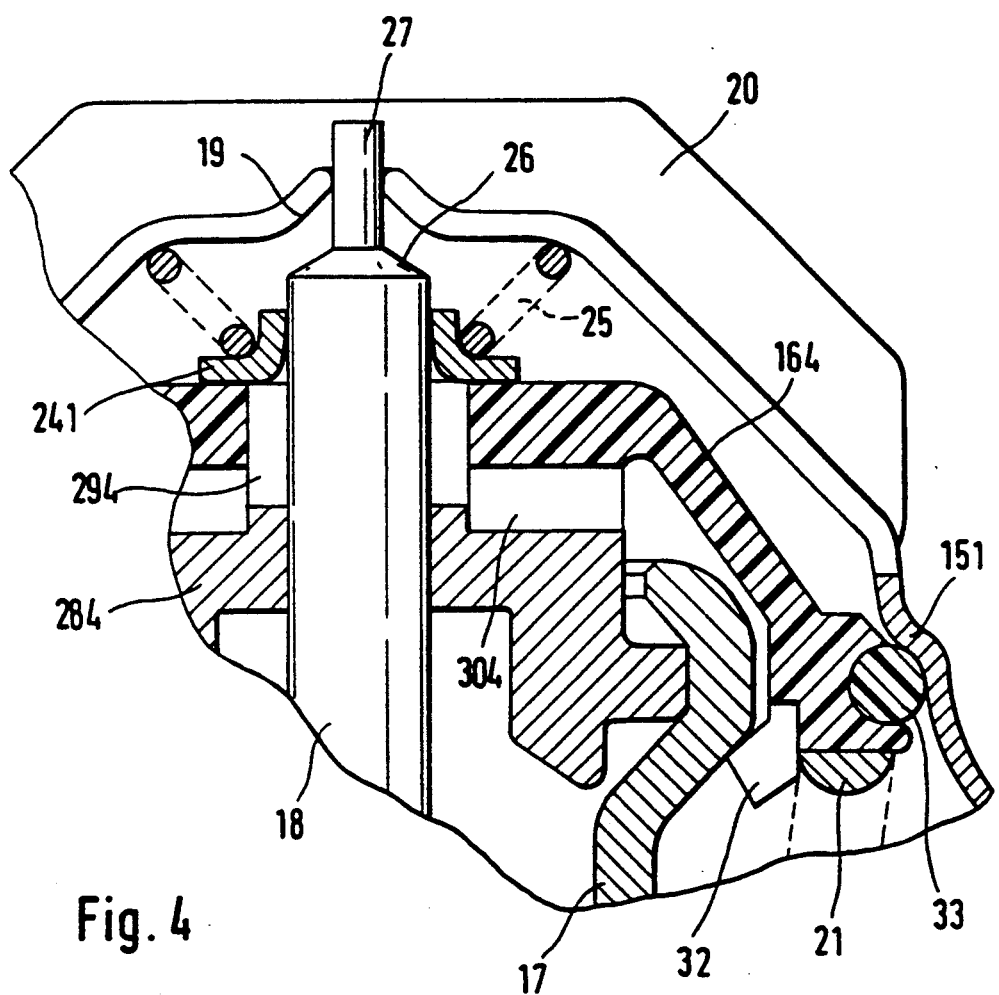
FIG. 4 is a partial sectional view similar to FIGS. 2 and 3 according to another embodiment of the present invention.

The embodiment according to FIG. 4 differs from the embodiment according to FIG. 3 by the fact that the radial bores 304 and the ring chamber 294, which form the bypass connection, are formed by the valve disk 164 manufactured as a molded plastic part. By means of a hub part, the valve disk 164 is centered on a ring shoulder of a cover part 284 of the housing 17 of the thermostatic working element and reaches around the housing 17 by means of detents 32. The hub part of the valve disk 164 has the radial bores 304 which may also only be incisions. In addition, its interior edge maintains a distance from the working piston 18 in order to form the ring chamber 294 to which the closing member 241 is assigned.

As explained above by means of FIG. 1, the thermostatic valve device 10 according to the invention is used as a throttle control device. It is also possible to use this thermostatic valve device in a known manner as a short-circuit-controlling regulator, for the purpose of which a pin with a slidable short-circuit valve disk and a short-circuit valve spring will then be arranged at the lower end of the housing, a corresponding short-circuit opening then being assigned to the housing as an axial extension instead of the throttle opening 13.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A thermostatic valve device for a coolant circulating system of an internal-combustion engine, comprising:
   a thermostatic working element which has a housing containing an expansion material and a working piston which is movable out of the housing in a moving-out direction;
   a valve disk and a valve seat that forms a valve, the valve disk being connected to the housing;
   a restoring spring coupled to the housing;
   an abutment configured to engage a face of the working piston such that, when the working piston moves out, the housing moves against the action of the restoring spring to lift the valve disk off the valve seat; said abutment being a thrust bearing;
   an idle path between the abutment and the working piston, said idle path being bridged by a first part of the moving-out movement;
   a bypass connection with bypasses the valve;
   a closing member mounted on the working piston and which closes and opens the bypass connection, the bypass connection and the closing member forming a pilot valve which opens during the moving-out of the working piston for bridging the idle path; and
   a closing spring coupled to the closing member and loading the closing member against the moving-out direction of the working piston.

2. A thermostatic valve device according to claim 1, further comprising a cover part of the housing of the working element which forms a guide for the working piston, wherein the bypass connection is machined into the cover part, and the valve disk is mounted on the cover part.

3. A thermostatic valve device according to claim 1, wherein the bypass connection comprises a ring duct which is open in the moving-out direction of the working piston, wherein the closing member is a control valve disk that is mounted on the working piston.

4. A thermostatic valve device according to claim 1, wherein the cover part, has a plurality of radial bores which are on a side facing away from the moving-out side of the working piston with respect to the valve disk and which are followed by the ring duct which is open in the moving-out direction of the working piston.

5. A thermostatic valve device according to claim 1, wherein a valve disk is shaped of sheet metal and is fastened to the cover part by an edging.

6. A thermostatic valve device according to claim 1, wherein the valve disk is a molded plastic part, is mounted on the cover part, and has a plurality of detents reaching around an edge bead of the housing.

7. A thermostatic valve device according to claim 6, wherein the valve disk has a hub part which is radially and axially supported on the cover part and which, together with the working piston, forms a ring duct which is open in the moving-out direction and which is connected with a plurality of connecting openings provided in the hub part.

* * * * *